United States Patent [19]
Chang

[11] Patent Number: 6,003,884
[45] Date of Patent: Dec. 21, 1999

[54] HANDCART

[76] Inventor: Wen-Chen Chang, 58, Ma Yuan West St., Taichung, Taiwan

[21] Appl. No.: 08/938,023

[22] Filed: Sep. 12, 1997

[51] Int. Cl.$^6$ ........................................................ B62B 1/00
[52] U.S. Cl. ........................................ 280/47.24; 280/655
[58] Field of Search ............................ 280/47.131, 47.24, 280/47.17, 47.26, 47.27, 654, 655, 655.1; 248/129

[56] References Cited

U.S. PATENT DOCUMENTS

| | | | |
|---|---|---|---|
| 4,893,824 | 1/1990 | Turek et al. | 280/47.27 |
| 5,257,800 | 11/1993 | Yang | 280/654 |
| 5,294,145 | 3/1994 | Cheng | 280/47.28 |
| 5,397,151 | 3/1995 | Jserng | 280/654 |
| 5,421,605 | 6/1995 | Chen | 280/655 |
| 5,515,576 | 5/1996 | Tsai | 16/115 |
| 5,630,488 | 5/1997 | Chen | 190/115 |
| 5,639,109 | 6/1997 | Liang | 280/655 |
| 5,709,398 | 1/1998 | Lu | 280/47.24 |
| 5,730,264 | 3/1998 | Lu | 190/108 |
| 5,864,921 | 2/1999 | Chou | 16/115 |

*Primary Examiner*—Lanna Mai
*Assistant Examiner*—Jeff Restifo

[57] ABSTRACT

A handcart has a handle, two inner pipes connected to the handle, a movable seat having a downward groove, an opening, two rail plates, two lateral through holes, two lateral recesses, two upper sleeves each receiving the respective inner pipe, two lower sleeves each connected to the respective upper sleeve, two outer pipes each inserted in the respective lower sleeve and receiving the respective inner pipe, and a lower seat having two lateral sleeves receiving two lower ends of the outer pipes. The lower seat has an upward groove. A press button has a downward protruded block with two flat laterals and two lateral flanges. A cover plate has two lateral protrusions. A hollow block has a notch, a post, an inclined face, and a rod. A positioning plate has a slant, a pillar, and a bar. The press button is inserted in the opening and disposed between the rail plates. The rail plates block the lateral flanges. The positioning plate is inserted in the notch. A spring is disposed between the post and the pillar.

3 Claims, 3 Drawing Sheets

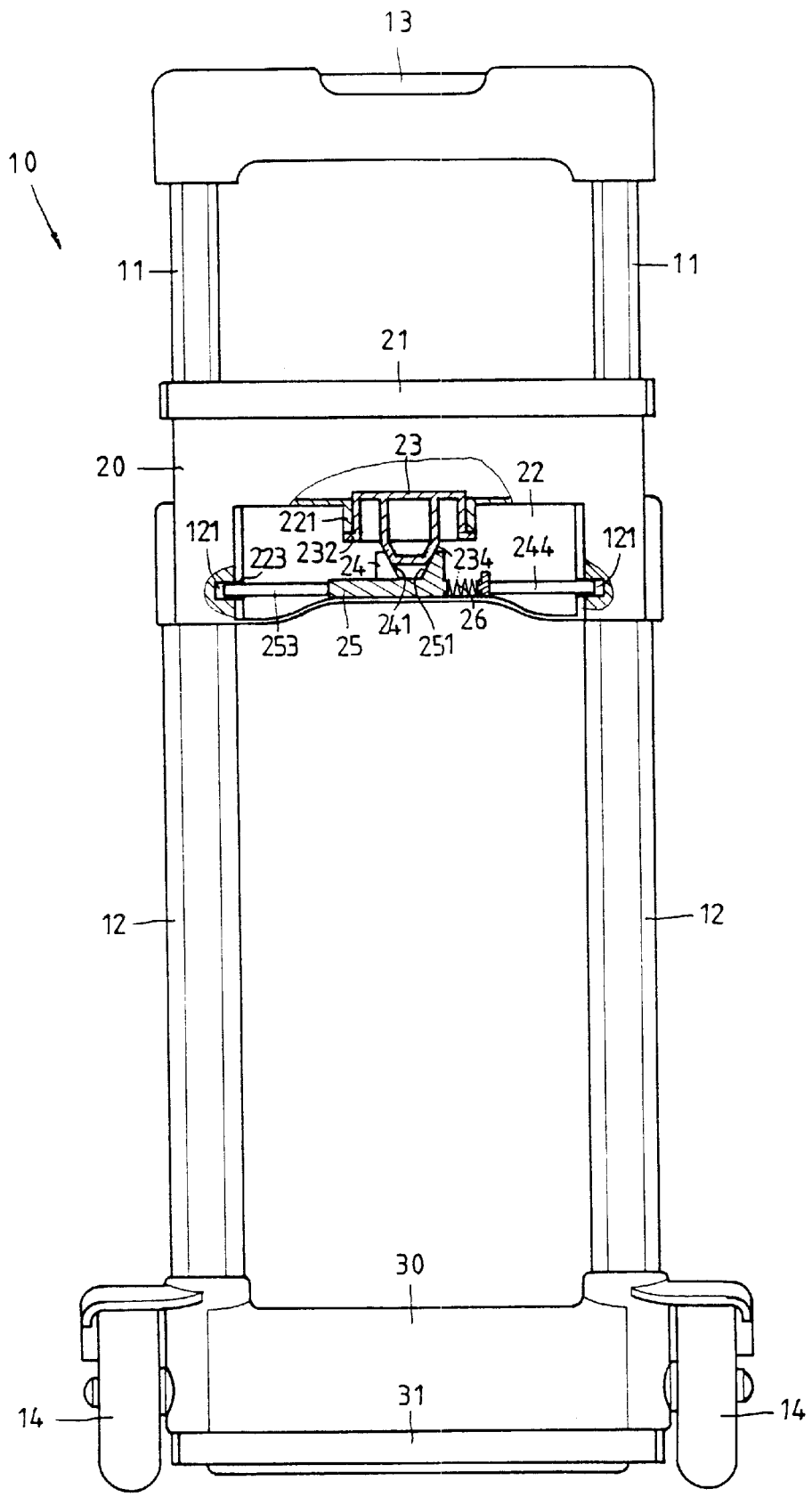
F I G. 2

HANDCART

BACKGROUND OF THE INVENTION

The present invention relates to a handcart. More particularly, the present invention relates to a handcart which can hold a suitcase stably.

A conventional handcart has a band to fasten a suitcase. However, the band will loose its elasticity after a long period of usage.

SUMMARY OF THE INVENTION

An object of the present invention is to provide a handcart which can hold a suitcase stably.

Accordingly, a handcart comprises a handle, two inner pipes connected to two lower ends of the handle, a movable seat having a hollow interior, a downward groove, an opening, two parallel rail plates, two opposite lateral through holes, two opposite lateral recesses, two opposite upper sleeves each receiving the respective inner pipe, two opposite lower sleeves each connected to the respective upper sleeve, two outer pipes each inserted in the respective lower sleeve and receiving the respective inner pipe, a lower seat having two opposite lateral sleeves receiving two lower ends of the outer pipes, and two wheels disposed on the lower seat. The lower seat has an upward groove. A press button has a downward protruded block with two bevels, two flat laterals, and two lateral flanges. A cover plate has two opposite lateral protrusions. A hollow block has a notch, a post, an inclined face, and a rod. A positioning plate has a slant, a pillar, and a bar. The press button is inserted in the opening and disposed between the rail plates. The rail plates block the lateral flanges. The positioning plate is inserted in the notch. A spring is disposed between the post and the pillar. The hollow block and the positioning plate are disposed in the hollow interior below the press button. Each outer pipe has a plurality of positioning holes formed on an upper portion of each outer pipe to receive the respective rod and the respective bar. The cover plate covers the hollow interior of the movable seat. The lateral protrusions are inserted in the lateral recesses. The inclined face abuts one bevel. The slant abuts the other bevel. When the press button is pressed downward, the downward protruded block will move downward. When the downward protruded block moves downward, the bevels will force the inclined face to move leftward and the slant to move rightward. Therefore, the rod disengages from the respective positioning hole and the bar disengages from the respective positioning hole. The user can adjust the movable seat by moving the movable seat upward or downward along the outer pipes. After the movable seat is moved to a predetermined position along the outer pipes, the press button is released. The rod is inserted in the respective positioning hole and the bar is inserted in the respective positioning hole. An upper flange of a suitcase is inserted in the downward groove. A lower flange of the suitcase is inserted in the upward groove.

BRIEF DESCRIPTION OF THE DRAWINGS

FIG. 2 is a partially sectional assembly view of a handcart of a preferred embodiment in accordance with the present invention.

DETAILED DESCRIPTION OF THE INVENTION

Figure 1:
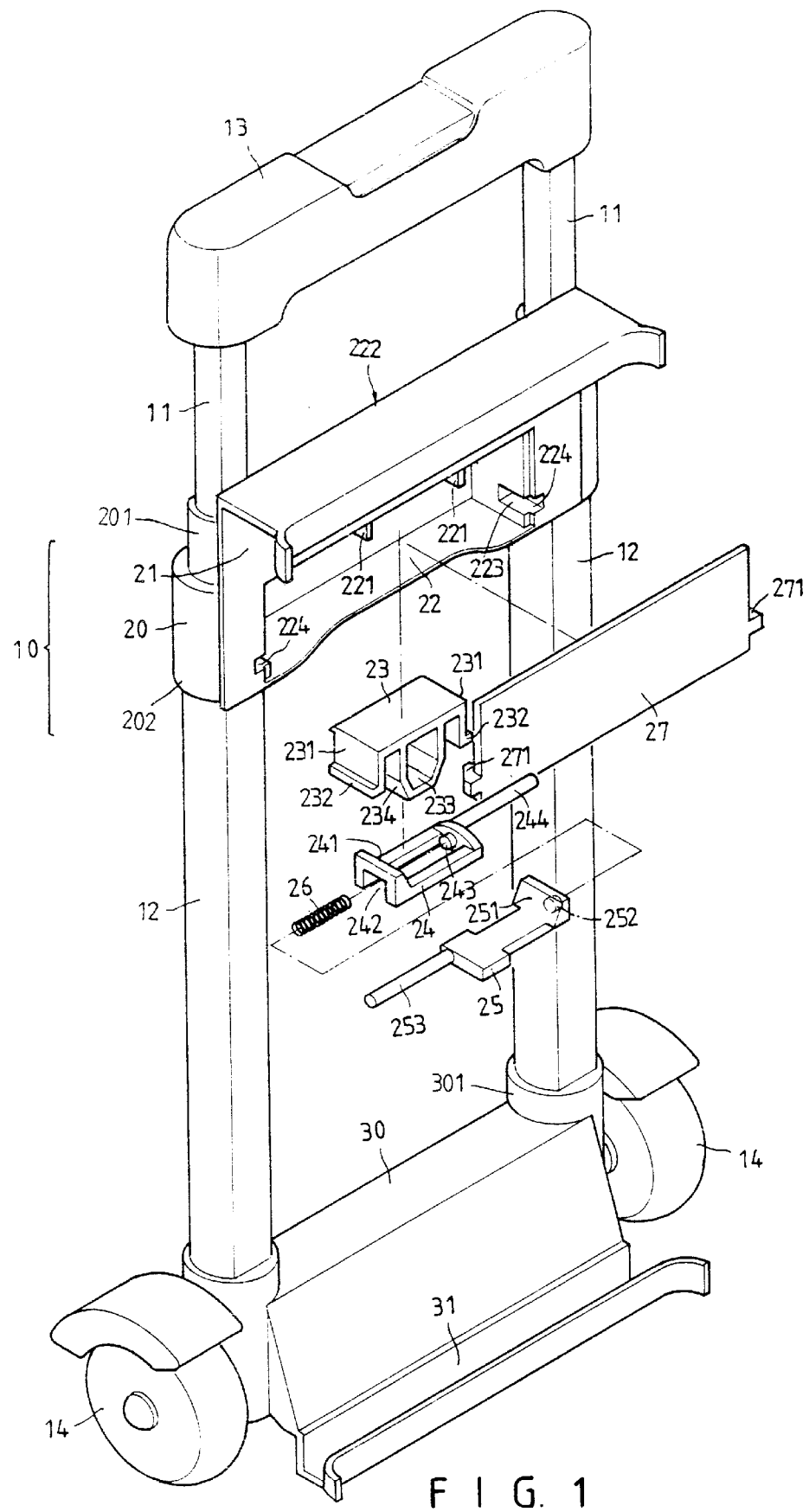
FIG. 1 is a partially perspective exploded view of a handcart of a preferred embodiment in accordance with the present invention.

Referring to FIGS. 1 and 2, a handcart 10 comprises a handle 13, two inner pipes 11 connected to two lower ends of the handle 13, a movable seat 20 having a hollow interior 22, a downward groove 21, an opening 222, two parallel rail plates 221, two opposite lateral through holes 223, two opposite lateral recesses 224, two opposite upper sleeves 201 each receiving the respective inner pipe 11, two opposite lower sleeves 202 each connected to the respective upper sleeve 201, two outer pipes 12 each inserted in the respective lower sleeve 202 and receiving the respective inner pipe 11, a lower seat 30 having two opposite lateral sleeves 301 receiving two lower ends of the outer pipes 12, and two wheels 14 disposed on the lower seat 30. The lower seat 30 has an upward groove 31. A press button 23 has a downward protruded block 233 with two bevels 234, two flat laterals 231, and two lateral flanges 232. A cover plate 27 has two opposite lateral protrusions 271. A hollow block 24 has a notch 242, a post 243, an inclined face 241, and a rod 244. A positioning plate 25 has a slant 251, a pillar 252, and a bar 253.

The press button 23 is inserted in the opening 222 and disposed between the rail plates 221. The rail plates 221 block the lateral flanges 232. The positioning plate 25 is inserted in the notch 242. A spring 26 is disposed between the post 243 and the pillar 252. The hollow block 24 and the positioning plate 25 are disposed in the hollow interior 22 below the press button 23. Each outer pipe 12 has a plurality of positioning holes 121 formed on an upper portion of each outer pipe 12 to receive the respective rod 244 and the respective bar 253. The cover plate 27 covers the hollow interior 22 of the movable seat 20. The lateral protrusions 271 are inserted in the lateral recesses 224. The inclined face 241 abuts one bevel 234. The slant 251 abuts the other bevel 234.

When the press button 23 is pressed downward, the downward protruded block 233 will move downward. When the downward protruded block 233 moves downward, the bevels 234 will force the inclined face 241 to move leftward and the slant 251 to move rightward. Therefore, the rod 244 disengages from the respective positioning hole 121 and the bar 253 disengages from the respective positioning hole 121. The user can adjust the movable seat 20 by moving the movable seat 20 upward or downward along the outer pipes 12.

Figure 3:
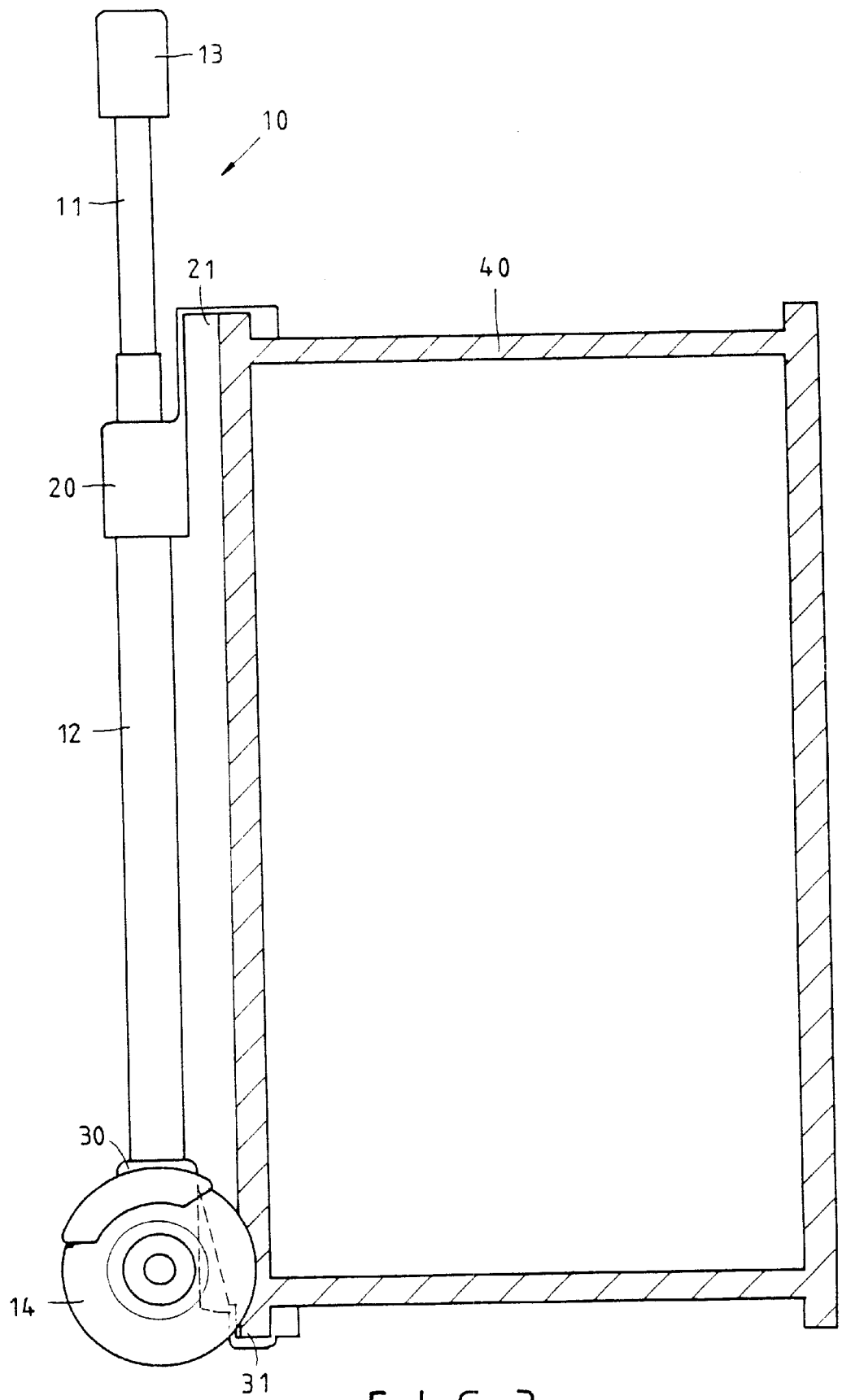
FIG. 3 is a schematic view illustrating an application of a handcart of a preferred embodiment in accordance with the present invention.

Referring to FIG. 3, the movable seat 20 is moved to a predetermined position along the outer pipes 12. The press button 23 is released. The rod 244 is inserted in the respective positioning hole 121 and the bar 253 is inserted in the respective positioning hole 121. An upper flange of a suitcase 40 is inserted in the downward groove 21. A lower flange of the suitcase 40 is inserted in the upward groove 31.

The present invention has the following advantages.

The handcart of the present invention can hold the suitcase stably.

The movable seat can be adjusted easily according to the size of the suitcase. Therefore, the distance between the downward groove and the upward groove can be varied according to the various size of the suitcase.

The present invention is not limited to the above embodiment but various modification thereof may be made. Furthermore, various changes in form and detail may be made without departing from the spirit and the scope of the present invention.

I claim:

1. A handcart comprises:

a handle, two inner pipes connected to two lower ends of the handle, a movable seat having a hollow interior, a downward groove, an opening, two parallel rail plates, two opposite lateral through holes, two opposite lateral recesses, two opposite upper sleeves each receiving the respective inner pipe, two opposite lower sleeves each connected to the respective upper sleeve, two outer pipes each inserted in the respective lower sleeve and receiving the respective inner pipe, a lower seat having two opposite lateral sleeves receiving two lower ends of the outer pipes, two wheels disposed on the lower seat, the lower seat having an upward groove, a press button having a downward protruded block with two bevels, two flat laterals, and two lateral flanges, a hollow block having a notch, a post, an inclined face, and a rod, a positioning plate having a slant, a pillar, and a bar, the press button inserted in the opening and disposed between the rail plates, the rail plates blocking the lateral flanges, the positioning plate inserted in the notch, a spring disposed between the post and the pillar, the hollow block and the positioning plate disposed in the hollow interior below the press button, and each outer pipe having a plurality of positioning holes formed on an upper portion of each outer pipe to receive the respective rod and the respective bar.

2. A handcart as claimed in claim 1, wherein a cover plate covers the hollow interior of the movable seat.

3. A handcart as claimed in claim 1, wherein the cover plate has two opposite lateral protrusions inserted in the lateral recesses.

\* \* \* \* \*